Patented Apr. 6, 1937

2,076,509

UNITED STATES PATENT OFFICE 2,076,509

COATING AND COATING COMPOSITION

Charles Hugh Whitelaw, Detroit, Mich., assignor to Cook Paint & Varnish Company, Kansas City, Mo., a corporation of Delaware No Drawing. Application July 30, 1934, Serial No. 737,673

1 Claim. (Cl. 91—68)

This invention relates to coating and coating compositions and it comprises an improvement in methods of producing a smooth varnish coating by rubbing down wherein a surface, preliminary to rubbing, is given a primary varnish coating containing material of a hardness of 8 or more on the Mohs scale and is thereafter provided with a varnish coating not containing material of a hardness of 8 or more on the Mohs scale; all as more fully hereinafter set forth and as claimed.

In the large scale production of automobiles, metal furniture, refrigerators, etc., a number of coats of varnish and lacquer are applied; usually by spraying; each coat being allowed to set up before the next is put on. The several coats may be of different compositions. It is common practice to employ baking oil varnish compositions containing drying oil in inner layers and pyroxylin base lacquers in outer layers; lacquers containing pyroxylin, a plasticizer and a resin. The successive coating layers usually have separate and different functions, each contributing some property or properties wanted in the final complete coating as an entirety. The finished coating comprises a multiplicity of coatings bonded together giving the desired thickness and other properties required in the particular instance.

In the usual routine, the metal is given a first, or primer coat followed by two or more surfacer coats. The coating is hardened and "wet rubbed" to a wholly smooth surface. Then a number of finish or color lacquer coats are applied, another "wet rub" given to impart polish and finally a "mist spray" is used. This is a spray of a lacquer solvent which may carry a little lacquer in solution and is used to soften the surface slightly and get rid of possible scratches.

The primer coat is a pigmented varnish and is particularly important since upon it depends the bond with the underlying metal and the protection against rust and corrosion. The surfacer coats are mainly to give sufficient thickness to fill surface imperfections in the metal and to withstand the abrasion of the "wet rub" and are usually of about the same composition as the primer coat. Commonly they are more highly pigmented. Sometimes the "primer" and the "surfacer" coats are combined, using a single thick layer or "primer surfacer". A "primer surfacer" composition usually contains an amount of soft pigment or filler intermediate between that of a "primer" and of a "surfacer" composition.

The "wet rub" or "wet sanding" is abrasion with a water-proofed abrasive paper in a flow of water to carry off debris. A very hard abrasive is used; silicon carbid, fused alumina, emery, corundum, etc. These have a hardness of 8 or more on the Mohs scale and are used for the sake of speed and economy.

All the coating compositions used are customarily pigmented; some of them heavily so. A wide variety of inert fillers and pigments are in use in various mixtures and various proportions. Among them are lithopone, red iron oxide, asbestine, aluminum silicates, lamp black, whiting, basic lead carbonate or white lead, calcium carbonate, barytes, blanc fixe, alumina flake, titanium dioxide, zinc oxide, chrome yellow, chrome orange, silica, etc. Some of these bodies are harder than others but none has a hardness approaching that of the abrasives used in wet rubbing.

The function of the wet rub is to provide a smooth uniform surface to which can be applied the subsequent color coats or finish coats. The metal used is generally more or less rough surfaced; this being particularly the case with the sheet metal used in the inexpensive grades of automobiles. Chemical methods of rust-proofing the metal do not improve its surface in this respect. The wet rub is intended to take off merely the high points in the surfacer coats leaving a smooth uniform surface. In practice, however, much of the surfacer coat is removed; this often being necessary with particularly rough metal. The operation is one requiring much skill to prevent cutting through the primer coat and baring the metal. Abrasion in localized areas is often fargoing, and metal is exposed. In the art, these areas of exposed metal are known as "cut through spots" or as "spots". Even with good work, inspection will often show 15 or 20 such spots on an automobile body after the wet rubbed or wet sanded coating has been washed and dried. Some of these spots are quite small and careful inspection is necessary to locate them.

In present practice, such spots when found, are retouched with a nitrocellulose lacquer or the like. While retouching hides the exposed metal and permits application of the finishing coats, it is objectionable. It increases the production cost and delays the operations. Also retouch spots lead to local rusting in a relatively short time when the finished coating is subjected to atmospheric conditions, such as rain, snow, etc., giving an unsightly appearance to the coated article.

In the present invention I obviate these cut through spots and provide a method wherein the primer coat is protected and, thereby, the metal. In this invention, I incorporate in the primer coat a fine grit of one of the very hard abrasives mentioned, those having a hardness of 8 or more on the Mohs scale. The primer coat may be of any of the usual varnish compositions used for this purpose. Pigmented baking oil varnishes are suitable. The grit is an addition to whatever pigment may be in the varnish. On this primer coat I apply two or more surfacer coats as usual and harden the coat, thereafter wet rubbing. With a baking oil varnish, hardening is by baking. In wet rubbing the abrasive does not reach the metal and the continuity of the important primer coat does not suffer. After the wet rubbing gives an even surface, the usual lacquer coats are applied in the usual way; the ordinary practice being followed. Any suitable lacquer composition may be used.

In practice this expedient has been found to obviate cut through spots. In one run finishing 17 automobile bodies, none had a cut through spot that could be found by the most careful inspection.

The best grain size for the very hard filler in the primer layer varies with the routine of operation; and it varies somewhat with the particular abrasive used. It should not be so coarse as to wear out a spraying nozzle, or prevent the surface from taking a good finish, nor be so fine as to prevent a proper abrasion resisting function. Silicon carbid of a particle size between 240 and 600 grit is satisfactory. Other abrasion-resisting materials of like hardness and fineness may be used in lieu of silicon carbid.

As illustrating the effect of variations in the very hard material used and in the grit size, I note the results of certain comparative tests using hand rubbing on panels provided with a pigmented baking oil varnish primer coat and two surfacer coats. The surfacer coats were somewhat more heavily pigmented than the primer coats. The oil varnish was an ordinary composition of China-wood oil, perilla oil and a drier, bodied and then cut with the usual thinner; sufficient thinner being used to enable spray application. The mixture used for the primer coat contained in addition to the varnish base, an equal weight of a mixed soft filler (lamp black, iron oxide, barytes and alumina flake). The composition used for the surfacer contained a little more pigment, the ratio being about 35:65 instead of 50:50. Primer and surfacer coats were applied to the panels in an ordinary way and the coating baked at 240° F. for 40 minutes. A short air-drying was allowed between coats to prevent sagging. The panels were then wet rubbed by an experienced operator. With the panel not containing very hard material in the primer coat it was found that 41 strokes went through to the metal in spots. With hard filler in this coating, 49 strokes went through to the top of the primer coat but did not go through it. This large number of strokes was required because of the projection of silicon carbid particles in the primer coat proper into the surfacer coat. With 75 strokes the metal was not reached and it required 114 strokes to reach the metal.

To obtain definite data on the various commercially available materials with a hardness of 8 Mohs or more, a mechanical "sander" was installed having a reciprocating metal block with a surface about 3 inches by 4 carrying a sheet of abrasive paper. The block was reciprocated over the test surface by a crank, being weighted to give a pressure of about 6.2 kilograms. The throw of the crank was such that the block traversed an area on each panel amounting to about 21.6 square inches at a rate of 50 times per minute. After each 100 strokes, the paper was renewed. A stream of water was kept flowing over the panel. Panels were made carrying varying amounts of silicon carbid up to 20 per cent, varying grit size being used. The results are recorded in the following table. The first entered "no filler" was a blank; a panel carrying no hard abrasive in the primer coat:

| Percent silicon carbid | Grit size | Strokes to reach primer coating | Strokes to reach metal |
|---|---|---|---|
| No filler | | 8 | 17 |
| 10 | 240 | 150 | 470 |
| 15 | 240 | 625 | 900 |
| 20 | 240 | 750 | 900 |
| 10 | 280 | 115 | 500 |
| 15 | 280 | 300 | 800 |
| 20 | 280 | 300 | 725 |
| 10 | 320 | 125 | 340 |
| 15 | 320 | 300 | 525 |
| 20 | 320 | 300 | 800 |
| 10 | 500 | 20 | 260 |
| 15 | 500 | 20 | 400 |
| 20 | 500 | 25 | 300 |
| 10 | 600 | 20 | 225 |
| 15 | 600 | 15 | 300 |
| 20 | 600 | 25 | 270 |

In the first column, per cent silicon carbid means the amount of silicon carbid by weight in the primer coating.

Similar tests were made with abrasive paper upon panels carrying fine comminuted fused alumina in the primer coating. These may be tabulated as follows:

| Percent fused $Al_2O_3$ filler | Grit size | Strokes to primer coating | Strokes to metal |
|---|---|---|---|
| 10 | 280 | 25 | 150 |
| 15 | 280 | 25 | 250 |
| 20 | 280 | 31 | 310 |
| 10 | 320 | 25 | 205 |
| 15 | 320 | 50 | 100 |
| 20 | 320 | 25 | 108 |
| 5 | 500 | 25 | 30 |
| 10 | 500 | 27 | 30 |
| 15 | 500 | 18 | 115 |
| 20 | 500 | 15 | 50 |

To a certain extent, in the best practice of the present invention, there should be observed some correlation between the grit size of the abrasive on the paper and that in the primer coat. Better wear resistance results are obtained if the grit size of abrasive on the rubbing paper is the same size or smaller than that used in the primer coat.

The amount of silicon carbid or other grit or hard filler to be incorporated can be varied within wide limits, depending upon the abrasion-resistances desired in the dry coating. Ordinarily, not more than 20 per cent of hard filler based on the total solids is required; the total solids being the non-volatile, film-forming constituents of the coating composition. With 10 to 15 per cent hard filler on the total solids, good results are obtained. The usual primer compositions of the pigmented baking oil type contain about 50 per cent soft pigment and filler and 50 per cent liquid vehicle comprising 40 per cent non-volatile and 60 volatile and have a weight of about 12 pounds per gallon. To such primer the addition of from .8 to 1.7 pounds of hard filler per gallon is satisfactory for the present purposes.

For spraying, such primers are usually reduced with 1 part of thinner to 4 parts of primer and this reduction gives satisfactory distribution of the hard filler in the dry coating.

In reducing or thinning primers containing hard filler to spraying consistency, care should be exercised not to add undue amounts of thinner. If too much thinner be added, then the distribution of the hard filler in the final coating gives less hard filler per square inch of coated surface and lowers its abrasion resistance. In cases where relatively large amounts of thinner are required to obtain spraying consistency, then the percentage of hard filler added to the primer should be correspondingly increased to compensate for this dilution and obtain the desired concentration and distribution of hard filler in the final coating.

Whether or not the dry coating contains sufficient hard filler per square inch to give the desired abrasion resistance in a given case can be readily determined in a preliminary test with coated panels by means of a mechanical sander. Of course the amount of hard filler added to a given primer composition in any particular instance depends upon the primer composition, the hardness and grit sizes of the specific hard filler and on the procedure by which the modified primer composition is applied and spread or flowed on the metal to be coated. In any commercial embodiment of this invention, the conditions can be adjusted to give the best results by correlation with test panels subjected to the mechanical sander.

Where the very hard abrasive occurs entirely in the primer coat, as is usual in the practice of this invention, no difference in the appearance of the finished article results; any opacity or tendency to dullness resulting from the use of the filler being hidden.

In the practice of the present invention no particular change over the ordinary routine is required. In all cases a coat is applied containing a very hard fine grained material resisting abrasion. This is followed by two or more coats of about the same kind of varnish but not containing the very hard material. Then a wet rub with a very hard abrasive is used. The layer containing the hard grit is always situated below less hard layers which take the abrasion incident to the wet rub. It is usually next the metal although there may be a sub-primer. Structural metal is often chemically processed for rust-proofing and in this event the primer does not actually come in contact with bare metal.

The varnish composition carrying the very hard fine grit is applied by a spray; the composition being sufficiently thin to enable this. In order to prevent settling it is expedient to keep the mixture stirred as it is supplied to the spray mechanism.

In a particular embodiment of the present invention treating an automobile body, I used as the primer, a baking oil varnish to which a suitable amount of silicon carbid had been added to produce a coating withstanding abrasion. This varnish had a China-wood oil, perilla oil, rosin base and carried rather a large amount of pigment; the amount of pigment by weight being equal to that of the rest of the varnish before thinning. In detail, the particular mixture of pigments used consisting of 15 per cent red iron oxide, 3.5 lamp black, 60 barytes, 10.1 alumina flake and 11.4 aluminum silicate. The liquid vehicle of this varnish which constitutes 50 per cent of the varnish is composed of 39.4 non-volatile material and 60.6 volatile.

The varnish carried a lead manganese liquid drier and was bodied to the usual consistency.

In making up the primer composition the pigments were ground into the varnish in a steel ball mill and then admixed with thinner to give a heavy varnish; one weighing, in this case, 11.8 pounds per gallon.

To 968 gallons of primer so prepared were added 80.5 pounds of silicon carbid of 400 grit and the mixture stirred to evenly disperse the silicon carbid. The primer was not particularly changed in properties from a mechanical point of view but the weight per gallon was increased to 12.28 pounds. It was applied to the work in the way usual with a similar primer coating not containing grit. It was put on by a spray; being reduced with naphtha for this purpose in the ratio 4 parts primer to 1 part thinner. In this particular instance the primer coating was baked before applying a surfacer coat. Baking was for about 1.5 hours at 250° to 300° F. A surfacer coat was then applied, this hardened and wet rubbed as described. In this particular work the surfacer coat was also an oil varnish of about the same type except that it contained more pigment.

In other work, three layers of pigmented baked oil was applied, the first layer carrying the hard grit and the second and third being free from it. Between coatings there was a wait to allow the layer to set up and prevent sagging. Finally the three-layer assemblage was baked and was then wet rubbed, etc.

In both cases a smooth surface was obtained without cut through spots. To this surface commercial pyroxylin base lacquer was applied in the usual way.

In practicing the present invention, I may use other suitable primer compositions in lieu of the oil varnish mentioned ante. In using other compositions the silicon carbid may be incorporated with the primer in the same or any other suitable manner. For instance, the hard grit may be added to a synthetic resin type of primer.

Coatings made under the present invention exhibit more resistance to use and atmospheric exposure than those made without it; this being partly due to the absence of cut through spots affording avenues to the underlying metal and partly to an increased wear resistance. Scratches, blows, etc., do not reach the underlying metal because of the very hard protective coating given by the primer containing hard grit.

In the best type of primer coatings under the present invention, the amount of grit in the coating and the grit size are so related that on drying the primer coating the surface shows protrusions of grit particles. On applying the surfacer coatings these grit particles protruding above the average thickness of the primer coating enter into and lock with the surfacer coating.

What I claim is:

The process of coating an uneven surface with a smooth multiple layer coating comprising incorporating a filler of abrasive material having a hardness of at least 8 on the Mohs scale with a vehicle and applying the mixture to said surface, applying a surfacer coating, subjecting the surfacer coating to the action of a similar abrasive having a particle size equal to or smaller than that in the filler to even it and applying additional finish coatings to the evened coating.

CHARLES HUGH WHITELAW.